United States Patent [19]

Choi

[11] Patent Number: 5,064,448
[45] Date of Patent: Nov. 12, 1991

[54] SURGE DAMPENING THREE-PHASE PRODUCTION SEPARATOR

[75] Inventor: Michael S. Choi, Houston, Tex.
[73] Assignee: Conoco Inc., Ponca City, Okla.
[21] Appl. No.: 639,485
[22] Filed: Jan. 9, 1991
[51] Int. Cl.$^5$ .............................................. B01D 19/00
[52] U.S. Cl. .................................... 55/38; 55/51; 55/165; 55/174; 55/186; 55/345
[58] Field of Search ..................... 55/1, 8, 46, 51, 52, 55/165, 171–177, 186, 345, 346

[56] References Cited

U.S. PATENT DOCUMENTS

| | | | |
|---|---|---|---|
| 2,657,760 | 11/1953 | Glasgow | 183/2.7 |
| 2,681,150 | 6/1954 | Reid | 210/44 |
| 2,706,531 | 4/1955 | Lovelady et al. | 183/2.7 |
| 2,710,071 | 6/1955 | Kinser et al. | 183/2.7 |
| 2,713,919 | 7/1955 | Walker et al. | 55/174 X |
| 2,899,014 | 8/1959 | Sinex | 55/174 X |
| 2,910,136 | 10/1959 | Valliant et al. | 183/2.7 |
| 3,094,574 | 6/1963 | Glasgow et al. | 261/23 |
| 3,193,990 | 7/1965 | Smith | 55/175 |
| 3,228,174 | 1/1966 | Perry, Jr. | 55/45 |
| 3,413,778 | 12/1968 | Lavery et al. | 55/186 |
| 3,722,184 | 3/1973 | McMinn | 55/174 |
| 3,844,743 | 10/1974 | Jones | 55/174 |
| 4,518,403 | 5/1985 | Hertz | 55/194 |
| 4,617,031 | 10/1986 | Suh et al. | 55/52 |
| 4,978,373 | 12/1990 | Endacott | 55/165 |

OTHER PUBLICATIONS

Exhibit A-Drawing of CE Natco, "Six Degree of Motion", System (undated but admitted by applicant to be prior art).
International Application No. PCT/GB85/00533 to Neville Chamberlain et al.
Exhibit B-Brochure of Smith Industries, Inc. (Undated but admitted by Applicant to be prior art).

Primary Examiner—Charles Hart
Attorney, Agent, or Firm—A Joe Reinert

[57] ABSTRACT

A separating system is provided for a fluid stream containing oil, water and gas. The fluid stream has a nominal flow rate, a maximum surge flow rate, and a cycle time or period. The system includes upper and lower elongated horizontal vessels. A weir separates the upper vessel into an inlet surge chamber and a liquid over flow chamber. A gas separator is located in the inlet surge chamber of the upper vessel and separates gas from the incoming fluid stream. A gas outlet is defined in the upper vessel. A downcomer tube communicates the inlet surge chamber of the upper vessel with the lower vessel. Oil and water are separated from each other in the lower vessel, which has oil and water outlets defined therein. A liquid overflow drain line communicates the liquid overflow chamber of the upper vessel with the lower vessel. A fluid flow restriction is provided in the downcomer tube such that the nominal flow rate of the inlet stream can flow through the downcomer tube, and such that as the inlet stream flow rate approaches its maximum surge flow rate, liquid will spill over the weir into the liquid overflow chamber where it will temporarily accumulate and then drain down through the overflow drain line into the lower vessel.

32 Claims, 5 Drawing Sheets

SURGE DAMPENING THREE-PHASE PRODUCTION SEPARATOR

BACKGROUND OF THE INVENTION

1. Field Of The Invention

The present invention relates generally to systems for separating multi-phase fluid streams, and more particularly, but not by way of limitation, to a system for separating oil, water and gas from a production stream of a well when the stream is subject to fluid slugging and/or external motion.

2. Brief Description Of The Prior Art

The typical prior art system used for three-phase separation is a single, large, horizontal or vertical vessel.

There are several commonly encountered situations which greatly increase the difficulty of satisfactorily separating gas, oil and liquid from such a production stream. One situation is where high gas-to-liquid ratios are encountered. The second situation is where flow-induced surging is encountered. The third situation is where motion-induced surging is encountered, typically on offshore floating platforms.

When high gas-to-liquid ratios are expected, typically a larger vessel will be used with a lower liquid operating level.

When flow-induced surging is expected, it is typically accommodated by installing vessels larger than that which would otherwise be dictated by the nominal production rate. The peak surge rate becomes the sizing criteria. Such large separators extract high penalties in the cost of a larger vessel and the support structure. This is particularly troublesome in offshore production systems where fluid surging is common due to multi-phase flow lines and risers, and where deck space is at a premium. In many situations involving fluid slugging, even the larger separators are not able to produce good oil and water qualities. Fluid slugs produce such extreme flow acceleration and deceleration in the vessel that good separation is virtually impossible.

When motion generated turbulence is a problem, such as on floating offshore production platforms, current separator design employs various components inside the separator to combat the effects of motion. For example, a system marketed by the CE Natco Company and generally known as the "Six Degree of Motion" separator design utilizes a "box" constructed within a horizontal vessel to compartmentalize the liquid.

Thus there is a need for a separating system of the smallest possible size and weight which is capable of providing good separation of gas, water and oil from a production fluid stream having high gas-to-liquid ratios and/or severe flow-induced fluid surging and/or significant motion-induced surging, all of which normally interfere with the efficient operation of typical prior art separating systems.

SUMMARY OF THE INVENTION

A separating system is provided which is particularly suited for separation of a production fluid stream of an oil well, which stream includes oil, water and gas. The system is particularly well adapted for efficiently handling fluid streams subject to high gas-to-liquid ratios and/or flow-induced fluid surges and/or motion-induced fluid surging.

The separating system includes upper and lower horizontally elongated vessels typically mounted in a piggy-back fashion. The upper vessel is for degassing the incoming fluid stream and for dampening flow-induced fluid surges. The lower vessel is for separating the oil and water, and can be operated alternatively in either a high liquid level state, or a completely liquid packed state to minimize motion-induced fluid surging which interferes with the oil and water separation therein.

The upper vessel includes a first weir defining an inlet chamber and a liquid overflow chamber in the upper vessel. A fluid stream inlet is defined in the upper vessel and communicated with the inlet chamber.

A gas separator is located in the inlet chamber of the upper vessel and is operably associated with the fluid stream inlet for separating gas from the incoming fluid stream. A gas outlet is also defined in the upper vessel.

The lower vessel in which the oil and water are separated from each other, has an oil outlet and a water outlet defined therein.

An overflow liquid drain line connects the liquid overflow chamber of the upper vessel with the lower vessel.

The system is designed for treating the previously mentioned incoming multi-phase fluid stream, which can be described in terms of having a nominal expected flow rate, and a maximum expected surge flow rate.

A downcomer tube connects the inlet chamber of the upper vessel with the lower vessel. The downcomer tube has a fluid flow resistance defined therein which bears an important relationship to the expected characteristics of the incoming fluid stream. The fluid flow resistance defined in the downcomer tube is such that the nominal flow rate of the fluid stream can pass through the downcomer tube at a liquid head no greater than an elevation of the previously mentioned first weir located in the upper vessel. The flow resistance of the downcomer tube is also such that the maximum surge flow rate of the incoming fluid stream is prevented from passing through the downcomer tube at a head equal to the elevation of the first weir. Thus, when the incoming fluid stream is flowing at the maximum surge flow rate a portion of that fluid stream will overflow the first weir into the liquid overflow chamber of the upper vessel, and then will flow through the overflow liquid drain line into the lower vessel.

The effect of this is to reduce a maximum liquid flow rate through the lower vessel to a value which is less than the maximum surge flow rate of the fluid stream coming into the upper vessel.

This system, with numerous other refinements as described herein, provides a highly efficient means for handling the separation of multi-phase fluid streams, and particularly those involving high gas-to-liquid ratios and/or flow-induced fluid surging and/or motion-induced fluid surging.

Numerous objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
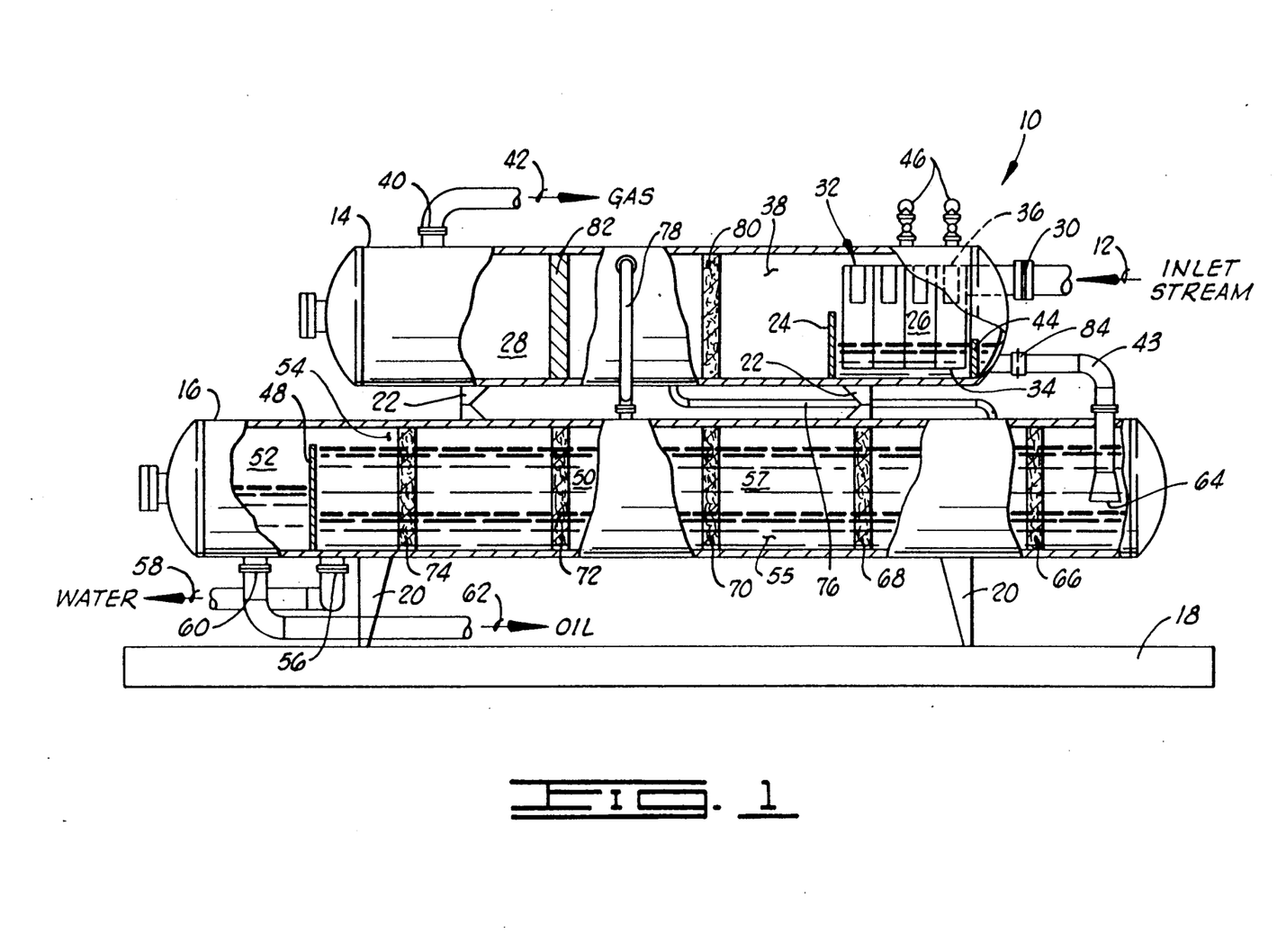
FIG. 1 is an elevation, schematic illustration of a fluid separating system designed for high liquid levels in the oil/water separation vessel, but without the oil/water separation vessel being completely liquid packed. The system is illustrated under inlet flow conditions at a nominal flow rate wherein the entire liquid portion of the inlet stream is flowing directly through the downcomer tube to the lower vessel without flowing into the liquid overflow chamber of the upper vessel.

Referring now to the drawings, and particularly to FIG. 1, the separating system of the present invention is thereshown and generally designated by the numeral 10. The system 10 is a system for separating the components of a multi-phase fluid stream indicated by the arrow 12. The incoming fluid stream 12 typically is a production stream coming from one or more oil and gas wells, and the stream typically contains oil, water and gas. As is further described below with regard to the example represented in FIGS. 4 and 5, the expected production stream can typically be characterized in terms of a nominal flow rate and a maximum surge flow rate. Further, the incoming flow stream can typically be modeled or characterized as having a somewhat periodic flow such that the flow rate surges above the nominal rate, and then drops below the nominal rate in a somewhat periodic fashion such that a time period or time cycle between consecutive surges can be predicted.

The system 10 includes a horizontally elongated upper vessel 14 and a horizontally elongated lower vessel 16. The upper vessel 14 is primarily for the purpose of degassing the incoming fluid stream and for dampening flow-induced fluid surges therein so as to isolate the lower vessel 16 from the flow-induced fluid surges. The lower vessel 16 is primarily for the purpose of separating the oil and water from each other in an environment that is isolated as much as possible from flow-induced fluid surging and from motion-induced fluid surging.

The lower vessel 16 is structurally supported from a base or floor 18 by supports 20. The upper vessel 14 is typically supported from the lower vessel 16 in piggyback fashion by structural supports 22.

A high weir means 24, which may also be referred to as a first weir means 24, located in the upper vessel defines an inlet surge chamber 26 generally to the right thereof as seen in FIG. 1, and a liquid overflow chamber 28 generally to the left thereof is seen in FIG. 1. The inlet surge chamber 26 may also be referred to simply as the inlet chamber 26.

A fluid stream inlet 30 is defined in the upper vessel for admitting the inlet stream 12 into the interior of the upper vessel 14.

A gas separator means generally designated by the numeral 32 is located in the inlet chamber 26 and is operably associated with the inlet 30 for receiving the inlet stream 12 and for separating gas from the incoming stream. The gas separator means 32 as schematically illustrated in FIG. 1 is preferably a centrifugal separator means including a plurality of hydrocyclones each having a lower outlet 34 through which liquid phases of the fluid stream are discharged from the separator 32 into the inlet surge chamber 26. The gas separated from the fluid stream flows out the upper ends 36 of the hydrocyclones into a vapor space 38 which generally overlies the first weir 24 and communicates with both the inlet surge chamber 26 and the liquid overflow chamber 28. A gas outlet 40 is defined in the upper vessel 14 and communicates with the vapor space 38 so that gas separated from the incoming fluid stream can pass out of the upper vessel 14 through the gas outlet 40 in a gas stream generally designated as 42.

A downcomer tube 43 connects the inlet surge chamber 26 with the lower vessel 16.

A low weir means 44 is also disposed in the inlet surge chamber 26 between the separator means 32 and the downcomer tube 43 for maintaining a sufficient minimum liquid level in the inlet surge chamber 26 at an elevation equal to the top elevation of the low weir means 44 (as illustrated in FIG. 1) thus providing a liquid seal at the lower outlet 34 of the centrifugal separator means 32.

Conventional safety relief valves 46 are utilized on the upper vessel 14.

The lower vessel 16 includes a liquid phase separator weir 48 for defining an oil/water separation chamber 50 and an oil overflow chamber 52 within the lower vessel 16. A lower vessel vapor space 54 generally overlies the weir 48 and communicates with both the oil/water separating chamber 50 and the oil overflow chamber 52.

The oil/water separation chamber 50 is volumetrically much larger than the oil overflow chamber 52 and occupies the major portion of the lower vessel 16. A sufficient residence time is provided for the oil and water flowing through the oil/water separation chamber 50 so that the oil and water separate into a distinct lower water layer 55 and upper oil layer 57. Thus only the oil layer 57 overflows the liquid phase separator weir 48 into the oil overflow chamber 52.

A water outlet 56 is defined in the lower vessel 16 and communicates with a lower portion, preferably the bottom of the oil/water separation chamber 50, and provides an outlet for a separated water stream 58.

An oil outlet 60 is defined in the bottom of the oil overflow chamber 52 of lower vessel 16 and provides an outlet for a separated oil stream 62.

The downcomer tube 43 has a lower end 64 which extends into the lower vessel 16 to an elevation substantially below the top of the liquid phase separator weir 48 to minimize turbulence created by the liquids flowing through the downcomer tube 43 into the lower vessel 16.

The downcomer tube 43 is generally located at an extreme end of the lower vessel 16 and as far as possible away from the weir 48 to maximize the flow paths for the liquids. Additionally, there are a plurality of stages of structured packing 66, 68, 70, 72 and 74 spaced along the length of the oil/water separation chamber 50 to aid in coalescing the oil and water into distinct homogeneous droplets to aid in the separation thereof. The structured packing also aids to minimize fluid motion within the lower vessel 16.

An overflow liquid drain line 76 connects the liquid overflow chamber 28 of upper vessel 14 with the lower vessel 16. A vapor equalization line 78 communicates the lower vessel vapor space 54 with the upper vessel vapor space 38.

In the upper vessel 14 there is one stage of structured packing 80 and a vane demister 82. The structured packing 80 serves to aid in demisting the gas by coalescing oil droplets therefrom. The structured packing 80 further functions to collapse any foam generated in the liquid overflow chamber 28 and to dampen turbulence created by liquid spillage over the first weir 24.

The vane demister 82 which is well known to those skilled in the art, serves to further remove oil droplets from the gas flowing toward the gas outlet 40. Another structured packing section could also be used for this demisting function.

A relatively small amount of the liquid components of the inlet stream 12 will be carried as mist by the gas which is separated out in the gas separator 32. A significant part of this mist will be removed by structured packing 80 and vane demister 82 and will then drain into the lower vessel 16 through the overflow drain line 76.

The downcomer tube 43 has a fluid flow resistance means 84 defined therein. The fluid flow resistance means 84 typically will be in the form of a valve, orifice plate or venturi but also could be suitably accomplished by appropriate sizing of the internal diameter of the conduit comprising the downcomer tube 43. The fluid flow resistance means 84 has a flow resistance to the flow of oil and water therethrough, commonly described as a flow coefficient designated by the symbol $C_v$, which is critically chosen as a function of the expected flow characteristics of the inlet stream 12 to achieve the desired performance of the system 10. The flow resistance means 84 provides a means for permitting the nominal flow rate of the fluid stream 12 to pass through the downcomer tube 43 at a head no greater than the elevation of the high weir 24. More particularly, the fluid flow resistance means 84 of the downcomer tube 43 has a resistance low enough that the nominal flow rate of the fluid stream 12 is permitted to pass through the downcomer tube 43 at a liquid head equal to the elevation of the low weir 44. Furthermore, the flow resistance means 84 is such that the maximum surge flow rate of the inlet stream 12 is prevented from passing through the downcomer tube 43 at a head equal to the elevation of the high weir 24.

By this arrangement, when the inlet stream 12 is flowing at its nominal flow rate as schematically illustrated in FIG. 1, the entire liquid component of the stream will flow through the gas separator 32, into the inlet surge chamber 26, then over the low weir 44 and down through the downcomer tube 43, into the lower vessel 16 without ever passing through the liquid overflow chamber 28 of upper vessel 14.

Figure 2:
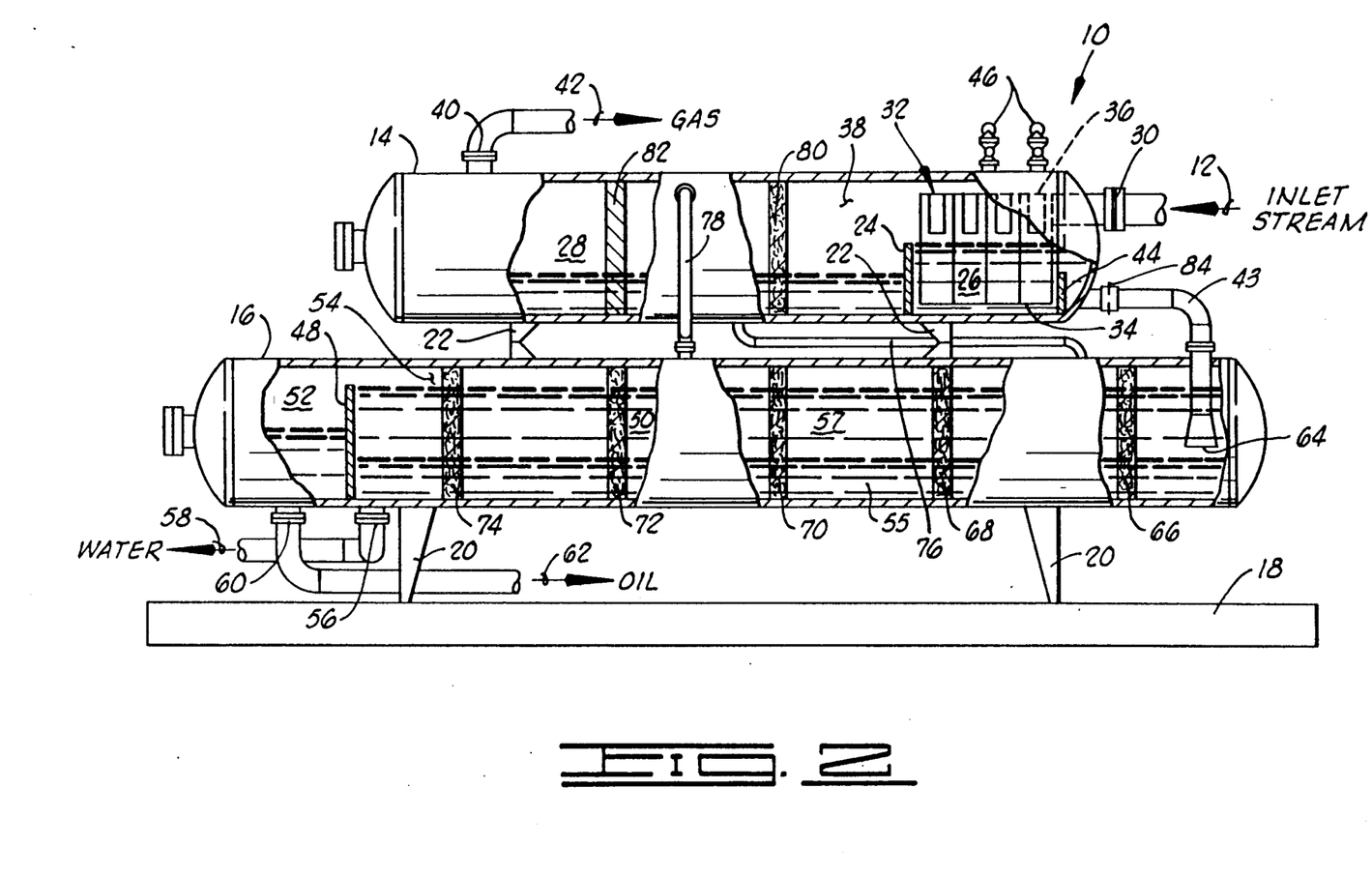
FIG. 2 is another illustration of the system of FIG. 1, but in this illustration the fluid stream is flowing in at a high surge flow rate so that a substantial portion of the incoming fluid is flowing over the high weir of the upper vessel into the liquid overflow chamber and then to the lower vessel.

The difference in elevation between the low weir 44 and the high weir 24 defines a surge chamber volume of liquid which can accumulate in the inlet surge chamber 26 due to surging, before any liquid begins to overflow the high weir 24. As the fluid flow stream 12 increases in flow rate above its nominal flow rate, a volume of liquid accumulates in the inlet flow chamber 26 thus reducing a flow rate through the lower vessel 16 to a value below the rate at which the fluid stream 12 is flowing into the upper vessel 14. As the liquid head increases in the inlet surge chamber 26, the flow rate through downcomer tube 43 will also increase, but will still be less than the incoming flow rate of the fluid stream 12. If the fluid flow surge continues, eventually liquid will begin to spill over the high weir 24 into the liquid overflow chamber 28 of upper vessel 14. This is schematically illustrated in FIG. 2. The liquid which spills over into liquid overflow chamber 28 must run through the liquid drain line 76 in order to reach the lower vessel 16. The liquid drain line 76 is much smaller than the downcomer tube 43 and thus it also restricts fluid flow therethrough so that the liquid temporarily accumulates in the liquid overflow chamber 28 as schematically illustrated in FIG. 2. The liquid overflow drain line 76 is sized such that it will drain the liquid overflow chamber 28 in a time period no greater than the cycle time between expected fluid surges in the flow stream 12.

Thus, both the surge chamber 26 and the liquid overflow chamber 28 act as accumulators which partially isolate the lower vessel 16 from fluid flow surges in the inlet stream 12 so that the maximum fluid flow rate which is ever experienced in the lower vessel 16 is substantially less than the maximum instantaneous fluid flow rate which from time to time will come into the inlet 30 of upper vessel 14.

In the embodiment of FIGS. 1 and 2, although a vapor space 54 is provided in the lower vessel 16, the vessel is operated with very high liquid levels as compared to typical prior art separators thus providing a maximum retention time within the vessel and minimizing the effects of motion-induced turbulence. The extremely high operating liquid level is made possible by degassing the inlet stream in the upper vessel 14. The gas separator 32 efficiently removes most of the free gas in the produced fluid leaving virtually gas-free liquid to drain into the bottom vessel 16. Therefore, only a relatively small vapor space 54 is required in the lower vessel 16 to accommodate the small amount of gas that may come out of solution. This in effect enables a smaller vessel to provide the required retention time for good phase separation.

Figure 3:
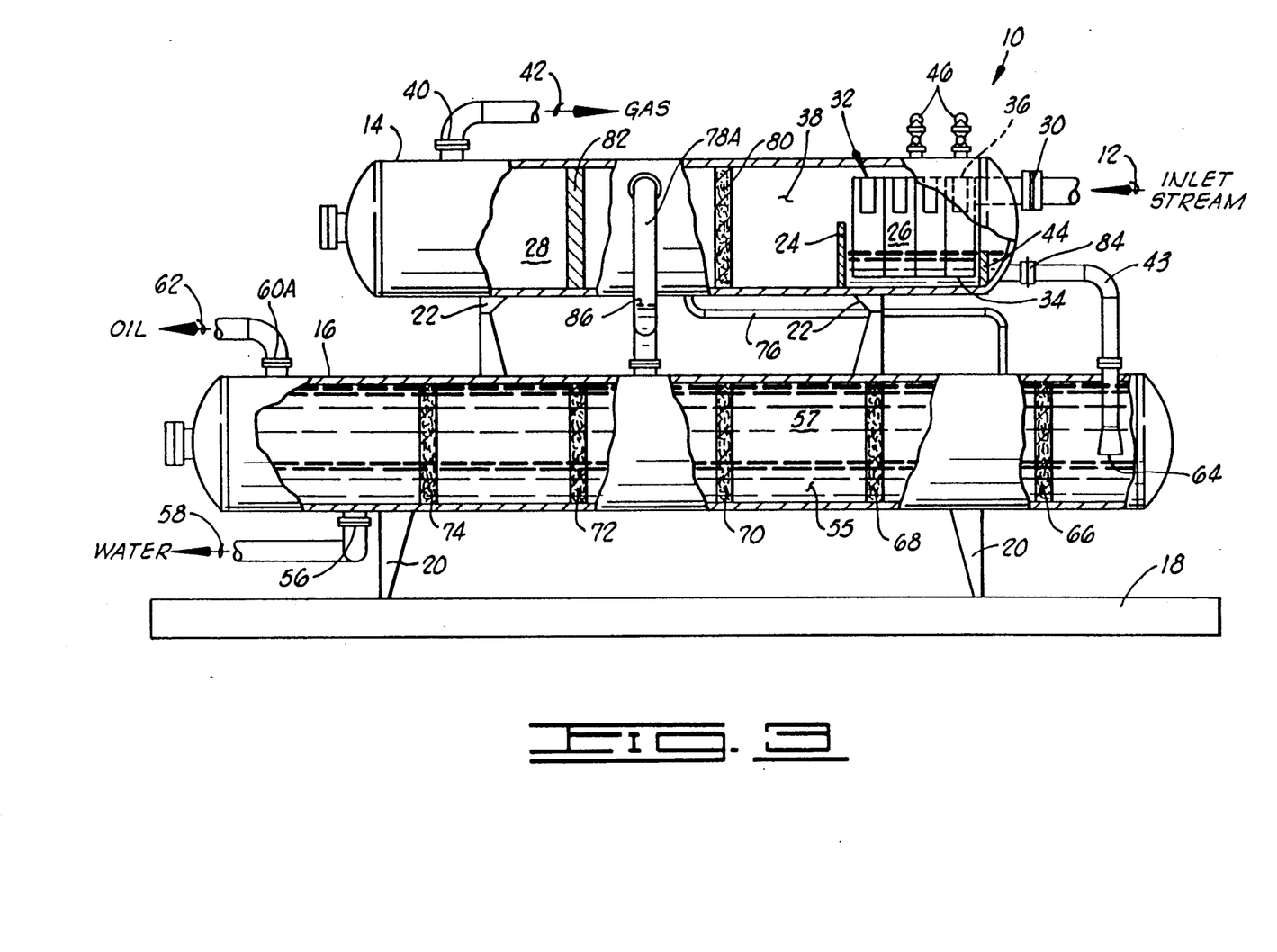
FIG. 3 illustrates a modified embodiment of the system of FIG. 1 wherein the lower vessel operates in a completely liquid-filled state.

Embodiment Of FIG. 3

The lower vessel 16 can also be constructed to operate in a liquid-filled state. This is accomplished by removing the liquid phase separator weir 48 and placing the oil outlet on the top of the lower vessel 16. Thus, the modified oil outlet 60A is shown in FIG. 3 located on top of the lower vessel 16.

With this embodiment, an oversized vapor equalization line 78A is utilized. The oversized vapor equalization line 78A is preferably mounted near the central vertical axis of the separator and stands partly filled with liquid so that a gas/oil interface 86 is defined therein. This provides a quiet chamber for gas/oil interface detection by means of an observation tube (not shown) which can be plumbed in parallel with the vapor equalization line 78A.

When the lower vessel 16 is modified as shown in FIG. 3 to operate in an entirely liquid-filled state, the negative effects caused by motion of the platform 18, for example when the platform 18 is mounted on a floating offshore structure, are minimized since there is no sloshing of liquid within the lower vessel 16.

Typical Flow Responses

The various components described above must of course be appropriately sized in order to achieve optimum performance from the system 10. The diameter of the upper vessel 16 is determined by calculating the gas scrubbing required as determined by the terminal velocity of a spherical liquid droplet particle derived from Stokes' Law using Newton's basic drag equation. The minimum length of the upper vessel 14 is established by the size of the centrifugal gas separator device 32, the liquid surge chamber volume required in inlet chamber 26 and liquid overflow chamber 28, and the space required by the packing 80 and vane demister 82 and good piping arrangement.

The centrifugal gas separator device 32 is designed according to hydraulic correlations for cyclone separators. The minimum height of the low weir 44 is determined by the minimum back pressure (i.e., liquid head) required to maintain a liquid seal at the cyclone liquid outlet 34. The location and height of the high weir 24 is set to provide the optimum liquid surge dampening in conjunction with the downcomer tube 43 and the drain flow characteristics thereof determined by the fluid flow resistance means 84. The downcomer tube 43 is sized to accommodate the peak liquid drain rate anticipated. The fluid flow resistance means 84 is designed to pass the expected nominal liquid rate corresponding to the nominal flow rate of inlet stream 12 with the liquid head available when the liquid level is at the same height as the low weir 44. The fluid flow resistance means 84, with its fixed flow coefficient, will pass more than the nominal rate when the liquid level in the inlet surge chamber 26 rises above the low weir 44. The overflow liquid drain line 76 is sized to empty the liquid overflow chamber 28 within one inlet surge cycle of the inlet stream 12.

When a flow-induced liquid slug arrives at the separator 32, the liquid level in the inlet surge chamber 26 will rise due to the flow restriction imposed by the fluid flow resistance means 84 in the downcomer tube 43. Although the fluid flow resistance means 84 will pass more liquid as the liquid level rises in inlet chamber 26, the increase will not be sufficient to compensate for the incoming fluid slug. As the slug continues, the level will rise to the top of the high weir 24 and the liquid will spill over into liquid overflow chamber 28. The liquid will then drain down to the lower vessel 16 through the smaller overflow liquid drain line 76. The drain rate through the overflow line 76 is regulated by the liquid head available to overcome the frictional loss in that piping. As a result, the instantaneous flow rate that the lower vessel 16 must accommodate is much lower than the actual rate arriving at the inlet 30 of upper vessel 14. The liquid temporarily accumulated in the upper vessel 14 shaves off the peaks of the incoming liquid slugs.

Figure 4:
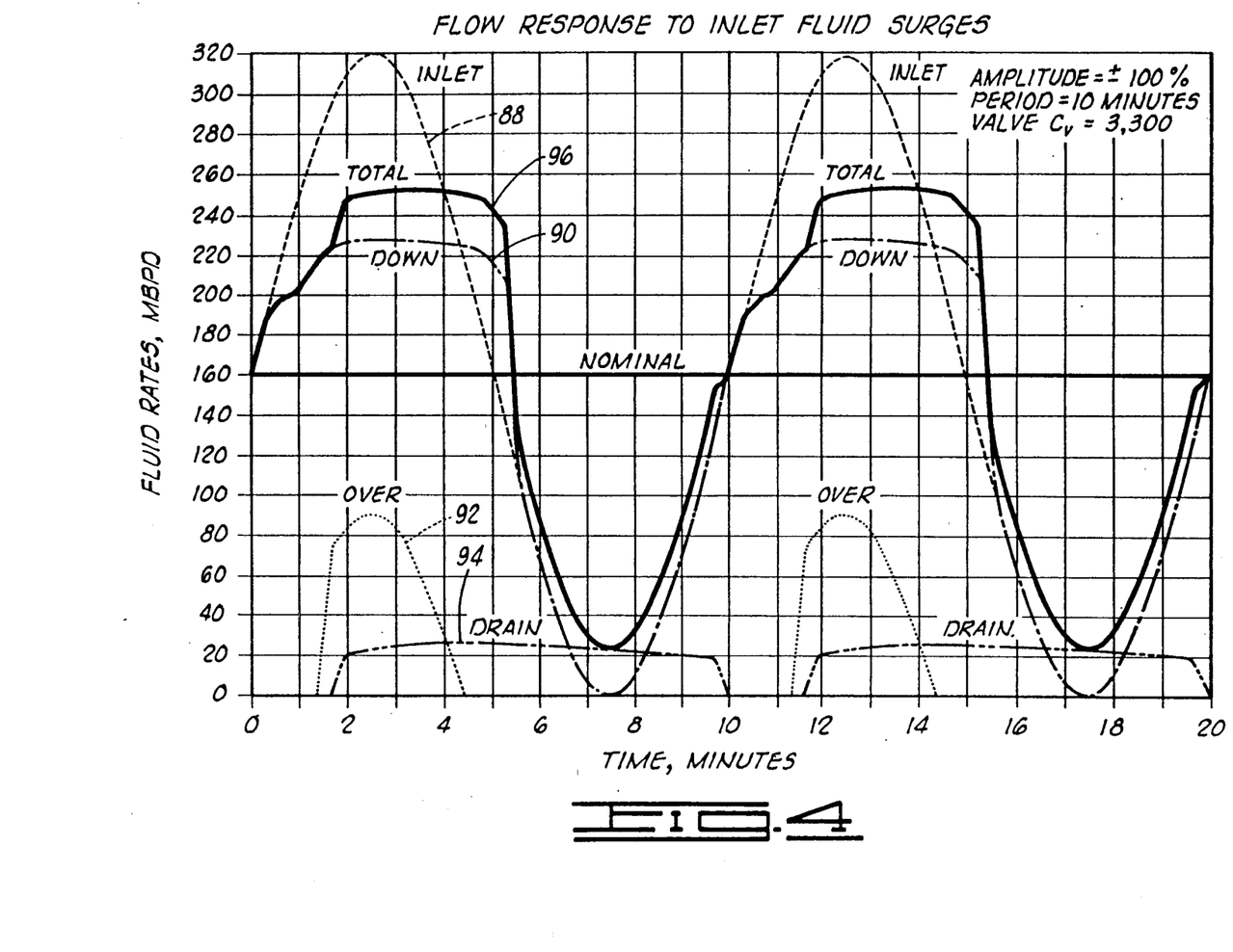
FIG. 4 is a graphic representation of the flow response through the various portions of the system for a typical example described herein.
Figure 5:
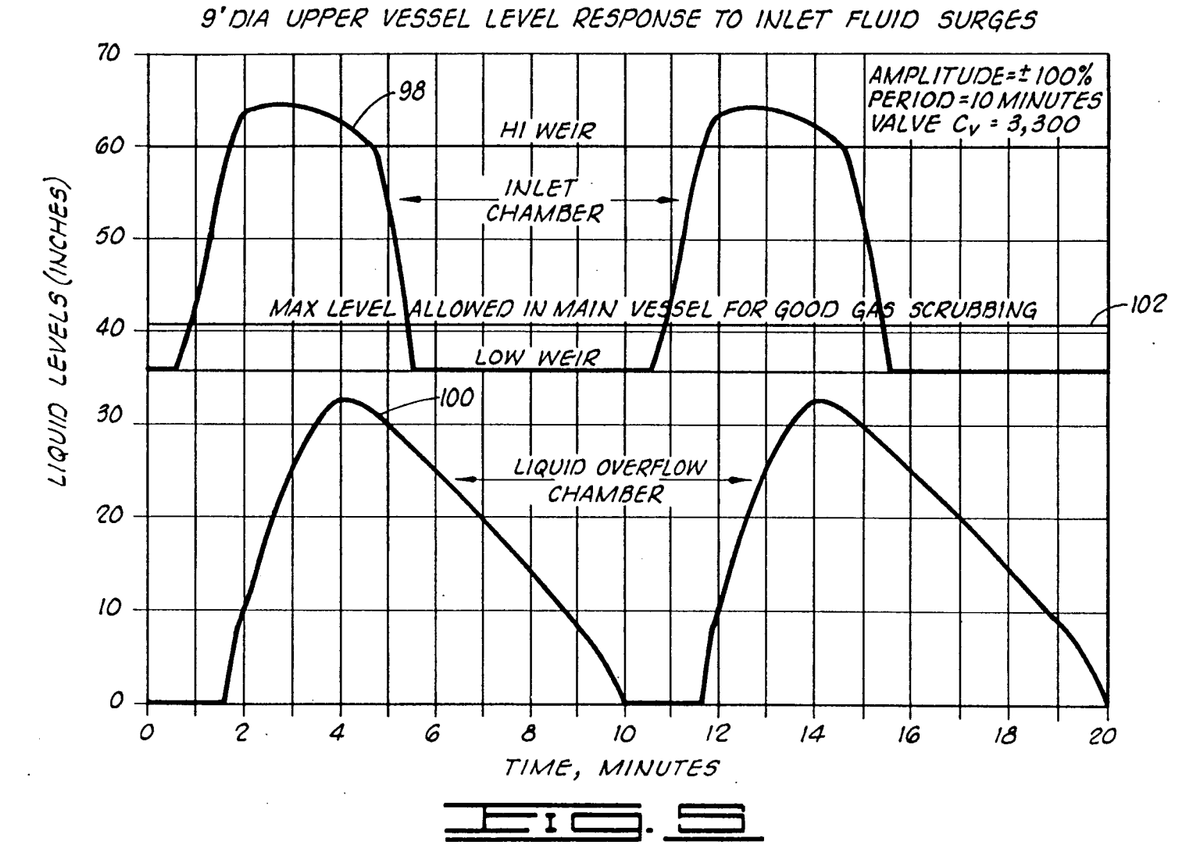
FIG. 5 is a further graphic illustration of the fluid levels in the inlet chamber and liquid overflow chamber of the upper vessel, corresponding to the same example conditions utilized in FIG. 4.

FIGS. 4 and 5 are graphic representations of the flow responses that may be expected from a typical separator of the type just described. The separator modeled in FIGS. 4 and 5 has upper and lower vessels 14 and 16 each with a nine-foot diameter. The upper vessel 14 has a length of forty feet and the lower vessel 16 has a length of sixty feet. The downcomer tube 43 has a sixteen-inch diameter, with the resistance means 84 providing a flow coefficient, $C_v = 3,300$. The low weir 44 has a height of thirty-six inches above the bottom of lower vessel 14, and the high weir 24 has a height of sixty inches. The overflow drain line 76 is six-inch nominal diameter pipe. The incoming fluid stream 12 was modeled as having a nominal fluid flow rate of 160 MBPD with a sinusoidal amplitude variation of ±100% with a period of ten minutes.

In FIG. 4, two complete surge cycles of the inlet stream 12 are represented. Various fluid flow rates within the system 10 are plotted as a function of time beginning at time zero with the nominal flow rate and at the beginning of a fluid surge.

The dashed line 88 represents the flow rate of the inlet stream 12. The broken line 90 represents the flow rate through downcomer tube 43. The dotted line 92 represents the flow rate over the high weir 24. The broken line 94 represents the flow rate through the overflow drain line 76. The solid line 96 represents the total flow rate into the lower vessel 16, which is equal to the flow rate 90 through downcomer tube 43 and the flow rate 94 through the overflow drain line 76.

As is apparent by comparing curve 88, which is the flow rate into the upper vessel 14, to the curve 96, which is the total flow rate into the lower vessel 16, the maximum instantaneous flow rate into the lower vessel 16 in this example is approximately 255 MBPD, whereas the maximum surge flow rate of inlet stream 12 into the upper vessel 14 is 320 MBPD.

FIG. 5 further illustrates the flow responses in this example by plotting the liquid levels (in inches) in the inlet surge chamber 26 as designated by curve 98 and in the liquid overflow chamber 28 as represented by curve 100.

In FIG. 5, a liquid level 102 is indicated corresponding to the maximum liquid level desired in the liquid overflow chamber 28 of upper vessel 14 to still permit good gas scrubbing in the upper vessel 14. This of course can be accomplished by appropriate sizing of the vessel 14 in relation to the expected inlet stream flow characteristics, and the drain characteristics of overflow drain line 76.

The dual vessel multi-phase separating system 10 thus provides a separator that is typically less costly than a conventional separating system for large flow volumes or for systems with high gas-to-liquid ratios. By splitting the gas scrubbing and oil/water separation services into two vessels, the diameters and lengths of the vessels can be smaller than that for a one vessel unit. Due to the vessel wall thickness to diameter relationship, the two smaller vessels can have much thinner walls. Since the cost of separators is very much a function of the vessel weights, the smaller, lighter wall vessels can be much lower in cost. Additionally, they will occupy less deck space and weigh less, thus providing significant advantages on offshore vessels where deck space and weight capacity are at a premium.

Additionally, the separating system described is a very efficient one which is capable of handling large gas-to-liquid ratio fluid streams and/or large fluid flow induced surges and/or minimizing the effect of motion-induced surging. The upper vessel 14 acts as a surge chamber to dampen flow induced surging, and also acts to degas the incoming liquid stream thus allowing the lower vessel 16 to operate in a much more stable environment which is more conducive to good oil and water separation.

Thus it is seen that the apparatus and methods of the present invention readily achieve the ends and advantages mentioned as well as those inherent therein. While certain preferred embodiments of the invention have been described for purposes of the present disclosure, numerous changes in the arrangement and construction of parts and steps may be made by those skilled in the art, which changes are encompassed within the scope and spirit of the present invention as defined by the appended claims.

What is claimed is:

1. A separating system for a fluid stream containing oil, water and gas, said fluid stream having a nominal flow rate and a maximum surge flow rate, comprising:
   a horizontally elongated degassing and surge dampening upper vessel, including;
   a first weir means for defining an inlet chamber and a liquid overflow chamber in said upper vessel;
   a fluid stream inlet communicated with said inlet chamber;
   a gas separator means, located in said inlet chamber and operably associated with said inlet, for separating said gas from said fluid stream; and
   a gas outlet defined in said upper vessel;
   a horizontally elongated liquid separating lower vessel, said lower vessel providing a means for separating said oil from said water, said lower vessel including an oil outlet defined therein and a water outlet defined therein;
   an overflow liquid drain line connecting said liquid overflow chamber of said upper vessel with said lower vessel; and
   a downcomer tube connecting said inlet chamber of said upper vessel with said lower vessel, said downcomer tube having a fluid flow resistance means defined therein for permitting said nominal flow rate of said fluid stream to pass therethrough at a head no greater than an elevation of said first weir means, and for preventing said maximum surge flow rate from passing therethrough at a head equal to said elevation of said first weir means, so that when said fluid stream is flowing at said maximum surge flow rate a portion of said fluid stream will overflow said first weir means into said liquid overflow chamber and then through said overflow liquid drain line into said lower vessel thus reducing a maximum liquid flow rate through said lower vessel to a value below said maximum surge flow rate of said fluid stream.

2. The system of claim 1, wherein:
said fluid flow resistance means of said downcomer tube is further characterized as a means for permitting said nominal flow rate of said fluid stream to pass therethrough at a lower head less than said elevation of said first weir means so that said inlet chamber defines a surge chamber volume between said lower head and said elevation of said first weir means.

3. The system of claim 1, wherein:
said upper vessel has a vapor space overlying said first weir means and communicating with both said inlet chamber and said liquid overflow chamber; and
said gas outlet communicates with said vapor space.

4. The system of claim 3, further comprising:
a vapor equalization line communicating said lower vessel with said vapor space of said upper vessel.

5. The system of claim 4, wherein:
said vapor equalization line communicates a vapor space of said lower vessel with said vapor space of said upper vessel.

6. The system of claim 4, wherein:
said lower vessel is so arranged and constructed as to operate liquid filled with said vapor equalization line standing partly filled with liquid to define a liquid-gas interface therein.

7. The system of claim 1, further comprising:
a liquid phase separator weir means, disposed in said lower vessel, for defining an oil/water separation chamber and an oil overflow chamber in said lower vessel.

8. The system of claim 7, wherein:
said oil/water separation chamber is larger than said oil overflow chamber.

9. The system of claim 7, further comprising:
a vapor equalization line communicating a vapor space of said lower vessel with a vapor space of said upper vessel.

10. The system of claim 1, wherein:
said oil outlet is disposed in a top of said lower vessel so that said lower vessel operates in a liquid filled state.

11. The system of claim 1, wherein:
said gas separator means is a centrifugal gas separator means having a lower outlet for liquid phases of said fluid stream; and
said upper vessel further includes a lower second weir means, between said lower outlet of said centrifugal gas separator means and said downcomer tube, for maintaining a sufficient minimum liquid level in said inlet chamber to provide a liquid seal at said lower outlet of said centrifugal gas separator means.

12. The system of claim 11, wherein
said flow resistance means of said downcomer tube is further characterized as a means for permitting said nominal flow rate of said fluid stream to pass therethrough at a head equal to an elevation of said second weir means.

13. The system of claim 1, said fluid stream having a cycle time between consecutive fluid surges, wherein:
said overflow liquid drain line is sized to drain said liquid overflow chamber within said cycle time.

14. The system of claim 1, wherein:
said upper vessel includes structured packing means, located in said liquid overflow chamber, for demisting gas, for collapsing any foam generated in said liquid overflow chamber, and for dampening turbulence created by liquid spillage over said first weir means.

15. The system of claim 1, wherein:
said lower vessel includes structured packing means for inducing oil/water coalescence to improve separation of oil from water in said lower vessel.

16. A separating system for a fluid stream containing three phases, comprising:
   a horizontally elongated upper vessel having an inlet for said fluid stream;
   a horizontally elongated lower vessel;
   a centrifugal separator means, disposed in said upper vessel and connected to said inlet thereof, for separating gas from said fluid stream, said separator means having a lower outlet for liquid phases of said fluid stream;
   a high weir means, disposed in said upper vessel, for defining an inlet surge chamber and a liquid overflow chamber in said upper vessel, said centrifugal separator means being located in said inlet surge chamber;
   a downcomer tube connecting said inlet surge chamber of said upper vessel with said lower vessel;
   a low weir means, disposed in said inlet surge chamber between said centrifugal separator means and said downcomer tube, for maintaining a sufficient minimum liquid level in said inlet surge chamber to provide a liquid seal at said lower outlet of said centrifugal separator means;

an overflow liquid drain line connecting said liquid overflow chamber of said upper vessel with said lower vessel;

a gas outlet defined in said upper vessel;

a water outlet defined in said lower vessel; and an oil outlet defined in said lower vessel.

17. The system of claim 16, wherein:

said upper vessel has a vapor space overlying said high weir means and communicating with both said inlet surge chamber and said liquid overflow chamber; and said gas outlet communicates with said vapor space.

18. The system of claim 17, further comprising:

a vapor equalization line communicating said lower vessel with said vapor space of said upper vessel.

19. The system of claim 18, wherein:

said vapor equalization line communicates a vapor space of said lower vessel with said vapor space of said upper vessel.

20. The system of claim 18, wherein:

said lower vessel is so arranged and constructed as to operate liquid filled with said vapor equalization line standing partly filled with liquid to define a liquid-gas interface therein.

21. The system of claim 16, further comprising:

a liquid phase separator weir means, disposed in said lower vessel, for defining an oil/water separation chamber and an oil overflow chamber in said lower vessel.

22. The system of claim 21, wherein:

said oil/water separation chamber is larger than said oil overflow chamber.

23. The system of claim 21, further comprising:

a vapor equalization line communicating a vapor space of said lower vessel with a vapor space of said upper vessel.

24. The system of claim 16, wherein:

said oil outlet is disposed in a top of said lower vessel so that said lower vessel operates in a liquid filled state.

25. The system of claim 16, said fluid stream having a cycle time between consecutive fluid surges, wherein:

said overflow liquid drain line is sized to drain said liquid overflow chamber within said cycle time.

26. The system of claim 16, further comprising:

a flow restriction means for limiting a maximum liquid flow rate through said downcomer tube to a value less than a maximum surge flow rate of said fluid stream at a liquid head equal to an elevation of said high weir means.

27. The system of claim 16, wherein:

said upper vessel includes structured packing means, located in said liquid overflow chamber, for demisting gas, for collapsing any foam generated in said liquid overflow chamber, and for dampening turbulence created by liquid spillage over said high weir means.

28. The system of claim 16, wherein:

said lower vessel includes structured packing means for inducing oil/water coalescence to improve separation of oil from water in said lower vessel.

29. A separating system for a fluid stream containing oil, water and gas, comprising:

a horizontally elongated upper vessel, including:

a first weir means for defining an inlet chamber and a liquid overflow chamber in said upper vessel, said upper vessel having an upper vessel vapor space defined therein above and communicated with said inlet chamber and said liquid overflow chamber;

a fluid stream inlet communicated with said inlet chamber;

a gas separator means, located in said inlet chamber and operably associated with said inlet, for separating said gas from said fluid stream; and a gas outlet communicated with said vapor space of said upper vessel; a horizontally elongated lower vessel, including:

a liquid phase separator means for defining an oil/water separation chamber and an oil overflow chamber in said lower vessel, said lower vessel having a lower vessel vapor space defined therein above and communicated with said oil/water separation chamber and said oil overflow chamber;

an oil outlet communicated with said oil overflow chamber; and a water outlet communicated with said oil/water separation chamber;

a downcomer tube communicating said inlet chamber of said upper vessel with said oil/water separation chamber of said lower vessel; and an overflow liquid drain line communicating said liquid overflow chamber of said upper vessel with said oil/water separation chamber of said lower vessel.

30. The system of claim 29, further comprising:

a vapor equalization line communicating said lower vessel vapor space with said upper vessel vapor space.

31. A separating system for a fluid stream containing oil, water and gas, comprising:

a horizontally elongated upper vessel, including:

a first weir means for defining an inlet chamber and a liquid overflow chamber in said upper vessel, said upper vessel having an upper vessel vapor space defined therein above and communicated with said inlet chamber and said liquid overflow chamber;

a fluid stream inlet communicated with said inlet chamber;

a gas separator means, located in said inlet chamber and operably associated with said inlet, for separating said gas from said fluid stream; and a gas outlet communicated with said vapor space of said upper vessel;

a horizontally elongated upper vessel, having a water outlet defined in a lower portion thereof and having an oil outlet defined in a top portion thereof so that said lower vessel operates in a liquid filled state;

a downcomer tube communicating with said inlet chamber of said upper vessel with said lower vessel; and an overflow liquid drain line communicating said liquid overflow chamber of said upper vessel with said lower vessel, further comprising:

a vapor equalization line communicating said lower vessel with said vapor space of said upper vessel, said vapor equalization line being arranged and constructed so that when said lower vessel is operating in said liquid filled state said vapor equalization line stands partly filled with liquid to define a liquid-gas interface therein.

32. A method of separating oil, water and gas from a fluid stream having a nominal flow rate and a maximum surge flow rate comprising:
  (a) directing said fluid stream into an upper vessel having an inlet chamber and a liquid overflow chamber defined therein;
  (b) separating said gas from said fluid stream in said inlet chamber of said upper vessel;
  (c) when said fluid stream is flowing at said nominal flow rate, flowing substantially all of said oil and water of said fluid stream from said inlet chamber of said upper vessel into a lower vessel without passing said oil and water through said liquid overflow chamber;
  (d) when said fluid stream is flowing at said maximum surge flow rate, flowing a first portion of said oil and water of said fluid stream from said inlet chamber into said lower vessel without passing said first portion through said liquid overflow chamber, and flowing a second portion of said oil and water from said inlet chamber through said liquid overflow chamber and then into said lower vessel; and
  (e) separating said oil and water from each other to said lower vessel, further comprising:
equalizing gas pressure in said upper and lower vessels by communicating said lower vessel with a vapor space of said upper vessel.

* * * * *